United States Patent
Gooch et al.

(10) Patent No.: US 6,618,633 B1
(45) Date of Patent: Sep. 9, 2003

(54) METHOD AND APPARATUS FOR CALIBRATING A FIRST CO-ORDINATE FRAME OF AN INDEXING MEANS IN A SECOND FRAME OF REFERENCE OF A SENSING MEANS

(75) Inventors: Richard M Gooch, Surbiton (GB); Richard Alexander, Pershore (GB)

(73) Assignee: Bae Systems plc, Farnborough (GB)

(*) Notice: Subject to any disclaimer, the term of this patent is extended or adjusted under 35 U.S.C. 154(b) by 0 days.

(21) Appl. No.: 09/647,545

(22) PCT Filed: Jun. 8, 2000

(86) PCT No.: PCT/GB00/02225
§ 371 (c)(1),
(2), (4) Date: Oct. 2, 2000

(87) PCT Pub. No.: WO01/00371
PCT Pub. Date: Jan. 4, 2001

(30) Foreign Application Priority Data
Jun. 26, 1999 (GB) .............................................. 9914918

(51) Int. Cl.⁷ .............................................. G05B 19/18
(52) U.S. Cl. .............................................. 700/59; 700/60; 700/56; 700/57; 700/58; 700/61; 700/71; 198/468.4; 198/750.12; 198/468.3
(58) Field of Search ......................... 700/59, 60, 56–58, 700/61–64, 70, 71; 198/468.3, 468.4, 750.11, 750.12; 414/627; 280/735; 701/45; 251/230

(56) References Cited

U.S. PATENT DOCUMENTS

| | | | |
|---|---|---|---|
| 4,753,569 A | | 6/1988 | Pryor |
| 4,810,154 A | * | 3/1989 | Klemmer et al. ...... 414/222.02 |
| 5,083,073 A | | 1/1992 | Kato |
| 5,224,716 A | * | 7/1993 | Saeda et al. ................ 279/5 |
| 5,297,238 A | | 3/1994 | Wang et al. |
| 5,526,671 A | * | 6/1996 | Polen ......................... 72/455 |
| 5,665,896 A | * | 9/1997 | McMurtry ................... 73/1.75 |
| 5,698,851 A | * | 12/1997 | Peschansky et al. ... 250/231.16 |
| 5,805,287 A | | 9/1998 | Pettersen et al. |
| 6,186,539 B1 | * | 2/2001 | Foo et al. .................... 280/735 |
| 6,419,680 B1 | * | 7/2002 | Cosman et al. ............. 606/130 |

FOREIGN PATENT DOCUMENTS

| | | |
|---|---|---|
| EP | 0 114 505 | 8/1984 |
| JP | 01-193902 | 8/1989 |
| WO | 98/11405 | 3/1998 |

OTHER PUBLICATIONS

H. Zhuang et al.: "A Noise–Tolerant Algorithm for Robotic Hand–Eye Calibration with or without Sensor Orientation Measurement" IEEE Transactions on Systems, Man, and Cybernetics, vol. 23, No. 4, (Jul. 1993) pp. 1168–1175.

* cited by examiner

*Primary Examiner*—Ramesh Patel
(74) *Attorney, Agent, or Firm*—Nixon & Vanderhye P.C.

(57) ABSTRACT

A method for calibrating a first co-ordinate frame of a robot and effector in a second frame of reference of a sensor when the sensor is substantially rigidly attached to the robot and effector, including the steps of measuring first positions of a plurality of first light sources relative to the sensor, with the first positions corresponding to a first absolute position of the robot and effector, moving the robot and effector, measuring second positions of the plurality of first light sources, which second positions correspond to the desired second absolute position of the robot and effector and the sensor, repeating the measurement of and movement from the first to second positions so as to provide at least two sets of measurements of first and second positions corresponding to at least two movements, each of which at least two movements is a known, unique transform, combining the at least two sets of measurements of first and second positions so as to calibrate the first co-ordinate frame in the second frame of reference.

27 Claims, 4 Drawing Sheets

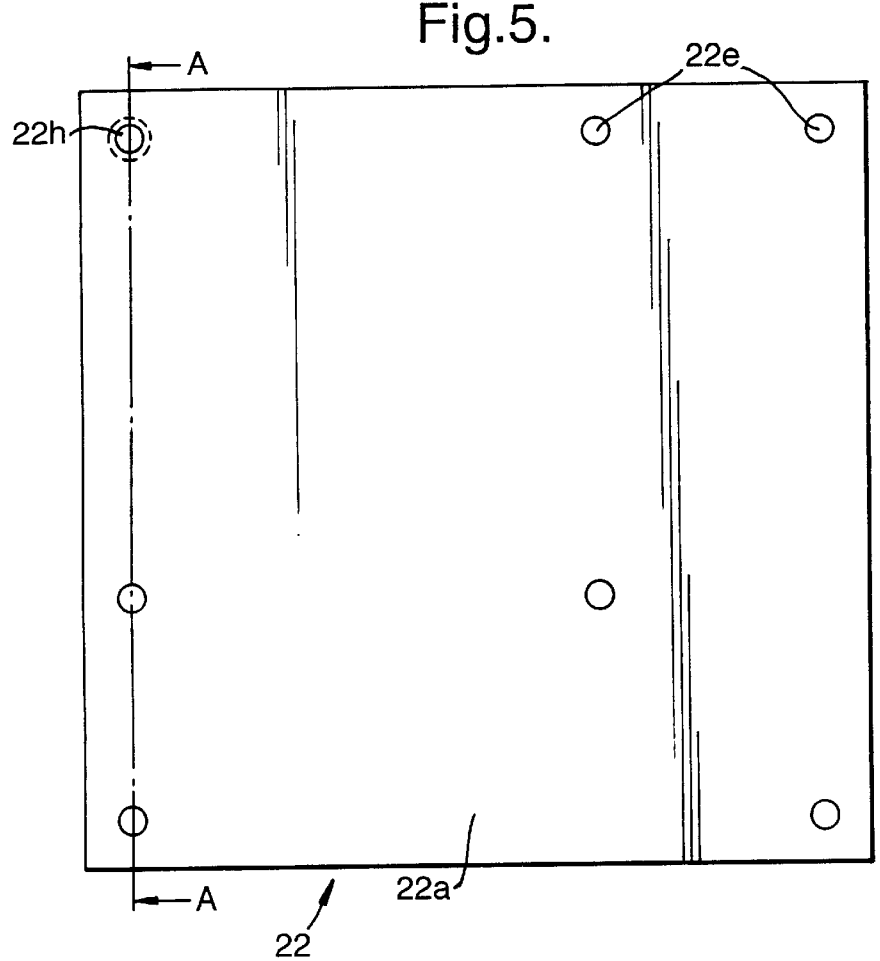
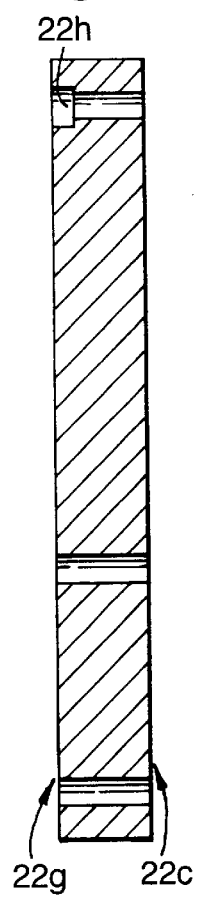
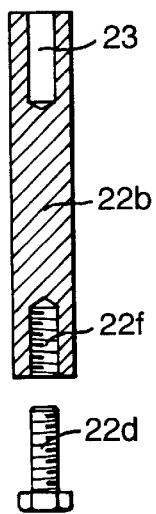

METHOD AND APPARATUS FOR CALIBRATING A FIRST CO-ORDINATE FRAME OF AN INDEXING MEANS IN A SECOND FRAME OF REFERENCE OF A SENSING MEANS

BACKGROUND OF THE INVENTION

1. Field of the Invention

This invention relates to a method and apparatus for calibrating a first co-ordinate frame of an indexing means such as a robot and end effector in a second frame of reference of a sensing means such as a sensor when the sensing means is substantially rigidly attached to the indexing means, particularly, but not exclusively suitable for use in robotic drilling operations.

2. Discussion of Prior Art

In any system involving automated movement of parts where the movement is controlled by an external sensor system, the relationship between the body performing the movement and the sensor system must be known in order to effect accurate robot motion. Typical sensor systems used with robots either require contact with or are remote from the robot and parts to be worked. The contact systems involve intensive alignment and are sensitive to environmental variations. The majority of six degree of freedom (6 DOF) non-contact configurations currently used have digital or film based cameras located remote from the robot, and typically a polar measurement device, such as a laser tracker, is used for calibration purposes instead of the 6 DOF system, introducing ancillary equipment and thus increasing costs through hardware and set-up time.

SUMMARY OF THE INVENTION

There is therefore a need for a generally improved method and apparatus for calibrating a first co-ordinate frame of an indexing means in a second frame of reference of a sensing means, where the sensing means is substantially rigidly attached to the indexing means, and thus utilises parts that will be used for on-line measurements.

According to a first aspect of the present invention there is provided a method for calibrating a first co-ordinate frame of an indexing means in a second frame of reference of a sensing means when the sensing means is substantially rigidly attached to the indexing means, including the steps of measuring first positions of a plurality of first light sources relative to the sensing means, each of which first light sources is remote from the sensing means and is either an active light source or an illuminable reflecting point, with the first positions corresponding to a first absolute position of the indexing means, moving the indexing means, measuring second positions of the plurality of first light sources relative to the sensing means, which second positions correspond to the desired second absolute position of the indexing means, repeating the measurement of and movement from the first to second positions so as to provide at least two sets of measurements of first and second positions corresponding to at least two movements, each of which at least two movements is a known, unique transform, combining the at least two sets of measurements of first and second positions of the plurality of first light sources relative to the sensing means by a transformation means such as a transformer so as to calibrate the first co-ordinate frame in the second frame of reference.

Preferably the measurements of first and/or second positions of the plurality of first light sources relative to the sensing means includes the steps of imaging on at least two imaging devices light reflected or projected from the plurality of first light sources, transmitting signals indicative of the distribution of reflected or projected light from each of the at least two imaging devices to a processor and combining the same so as to define the first and/or second positions of the plurality of first light sources relative to the sensing means.

Conveniently the known movements corresponding to the at least two sets of first and second positions are two translations.

Advantageously the known movements corresponding to the at least two sets of first and second positions are one translation and one rotation.

Preferably the known movements corresponding to at least two sets of first and second positions are two rotations about different axes, with or without at least one translation and/or further rotation.

Conveniently the combination of the at least two sets of first and second position measurements includes, for each of the at least two sets of first and second position measurements, combining each of the first and second measured positions with a matrix multiplication of the corresponding known movement transform and an unknown transform, which unknown transform describes the first co-ordinate frame in the second frame of reference to give a set of at least two expressions, summing each of the set of at least two expressions, and optimizing any errors resulting therefrom by standard optimization techniques, in order to determine the unknown transform, which unknown transform calibrates the first co-ordinate frame in the second frame of reference.

According to another aspect of the present invention there is provided apparatus for calibrating a first co-ordinate frame of an indexing means in a second frame of reference of a sensing means when the sensing means is substantially rigidly attached to the indexing means, including sensing means, indexing means for moving the sensing means when the sensing means is substantially rigidly attached thereto, a plurality of first light sources, which first light sources include active light sources or illuminable reflecting points and are locatable at a fixed position in space, a processor in operative association with the indexing means, transformation means in operative association with the processor, transmitting means for transmitting signals indicative of a first and a second position of each of the plurality of first light sources relative to the sensing means from the sensing means to the processor, which first and second positions of each of the plurality of first light sources relative to the sensing means correspond to an absolute first position and a desired, absolute second position of the indexing means respectively, such that when the indexing means moves from the absolute first position to the desired absolute second position, the first and second positions of each of the plurality of first light sources relative to the sensing means transmitted to the processor are thence combined by the transformation means so as to calibrate the first co-ordinate frame in the second frame of reference.

In a preferred embodiment the indexing means is a robot and an end effector the sensing means is a sensor and the transformation means is a transformer.

Conveniently the sensing means includes at least two imaging devices, each attachable to the end effector and each configurable to image each of the plurality of first light sources.

Advantageously each of the at least two imaging devices is a metrology sensor operable to create digitizable images, and which at least two imaging devices are substantially equi-spaced around the end effector.

Preferably there are at least two second light sources, each associated with a respective imaging device, and wherein the plurality of first light sources is a plurality of reflective targets.

Conveniently there is provided a first part, which first part carries the plurality of light sources and includes a rectangular plate, a shaft of substantially circular cross-section, which shaft is removably attachable to a first face of the rectangular plate and has at least one of the plurality of first light sources positioned thereon, and means for removably attaching the shaft to the rectangular plate.

Advantageously the transmitting means includes coaxial cables and frame grabber ports for transmitting a signal indicative of the first and a second positions of each of the plurality of first light sources relative to the sensing means to the processor.

BRIEF DESCRIPTION OF THE DRAWINGS

FIG. 5 is a plan view of a rectangular plate providing part of the first part of FIG. 4, FIG. 6 is a sectional end view of the rectangular plate of FIG. 5 taken on the line A—A, and FIG. 7 is a sectioned view of a shaft and bolt means providing part of the first part of FIG. 4.

DETAILED DISCUSSION OF EMBODIMENTS

In robotic drilling systems that use external sensors to measure position and orientation of parts to be drilled, the robot toolframe should be calibrated in a co-ordinate system characteristic of the sensors. This calibration is required because positional adjustments will be detected in the sensors co-ordinate system, but effected by the robot. A method according to the present invention for calibrating a first co-ordinate frame of a sensing means in a second frame of reference of an indexing means when the sensing means is substantially rigidly attached to the indexing means, as shown in FIGS. 1 to 7 of the accompanying drawings, is suitable for calibrating any system that moves parts, where the movement thereof is controlled by an external sensor system rigidly attached to the system itself, relative to the sensor system. In particular, the tool centre point of a robot can be calibrated in a co-ordinate system of a photogrammetry system attached to the robot end effector.

Figure 1:
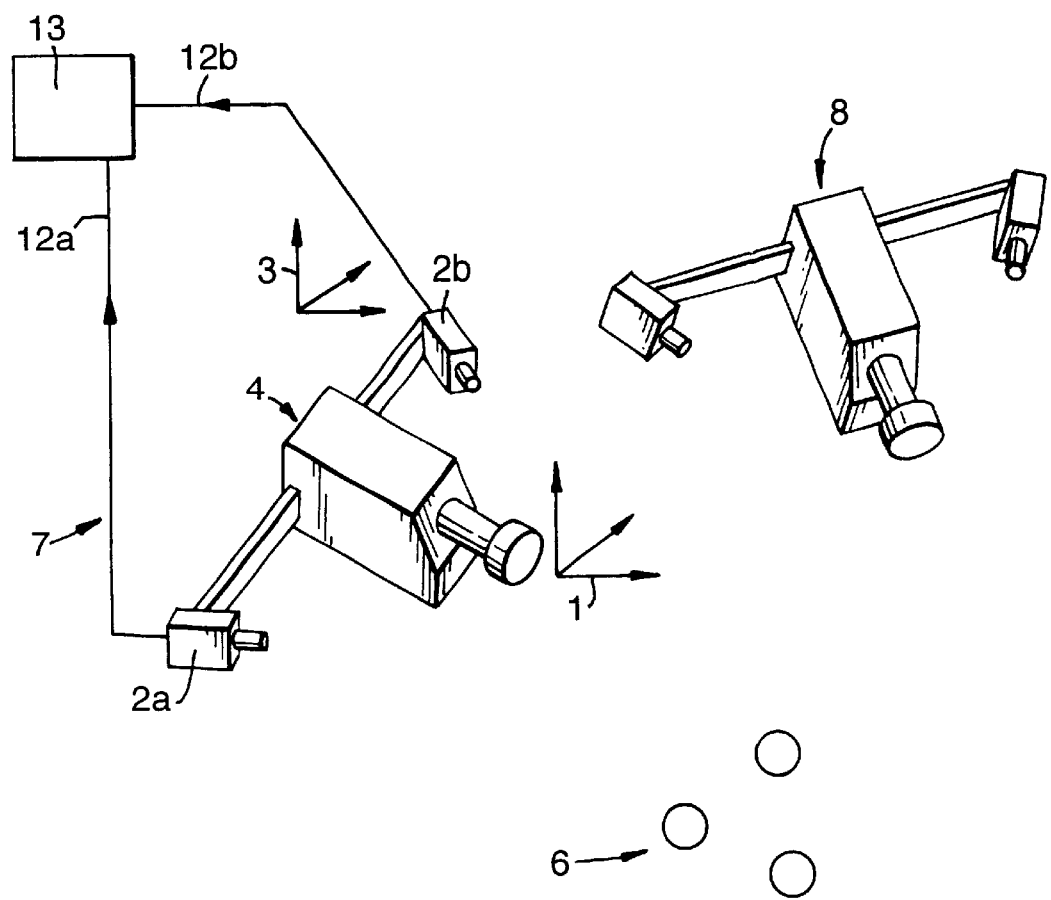
FIG. 1 is a schematic perspective representation of apparatus for calibrating a co-ordinate frame of a sensing means in a frame of reference of an indexing means when the sensing means is substantially rigidly attached to the indexing means according to the present invention.
Figure 2:
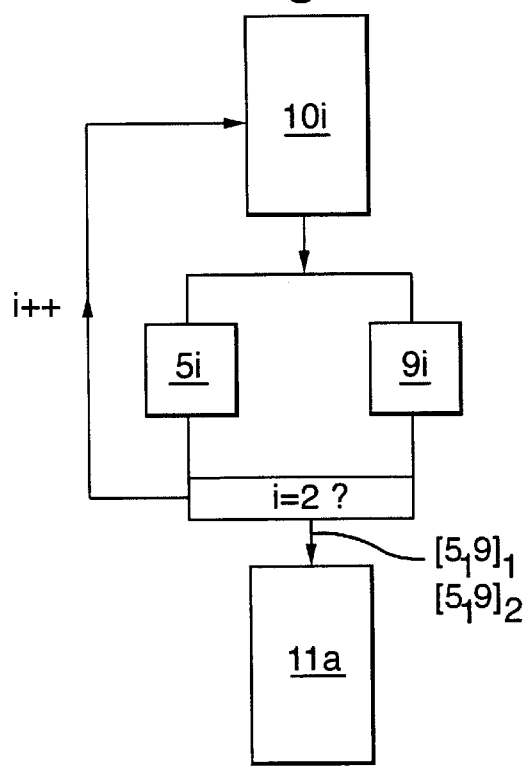
FIG. 2 is a block diagram of method steps applicable to the apparatus of FIG. 1.

Thus apparatus of the present invention as shown in FIG. 1 of the accompanying drawings utilises a method of the invention with reference to FIG. 2 of the accompanying drawings for calibrating a first co-ordinate frame 1 of an indexing means 4 in a second frame 3 of reference of a sensing means 2a, 2b when the sensing means 2a, 2b is substantially rigidly attached to the indexing means 4. The method includes the steps of measuring first positions 5 of a plurality of first light sources 6 relative to the sensing means 2a, 2b, each of which first light sources 6 is remote from the sensing means 2a, 2b and is either an active light source or an illuminable reflecting point, with the first positions 5 corresponding to a first absolute position 7 of the indexing means 4, moving the indexing means 4 to a desired second absolute position 8, and measuring second positions 9 of the plurality of first light sources 6 relative to the sensing means 2a, 2b, which second positions 9 correspond to the desired second absolute position 8 of the indexing means 4. Components 2a to 6 form part of the apparatus of the invention as will be later described.

As shown in FIG. 2, the method also includes repeating the measurement of and movement from the first to second positions 5, 9 so as to provide at least two sets of measurements of first and second positions $(5, 9)_1$, $(5, 9)_2$ corresponding to at least two movements, each of which at least two movements is a known unique transform $10_1$, $10_2$ and preferably includes two translations, or one translation and one rotation or at least two rotations about different axes, with or without at least one translation and/or further rotation. These two sets of measurements of first and second positions $(5, 9)_1$, $(5, 9)_2$ are then combined 11a to calibrate the first co-ordinate frame 1 in the second frame of reference 3.

Figure 3:
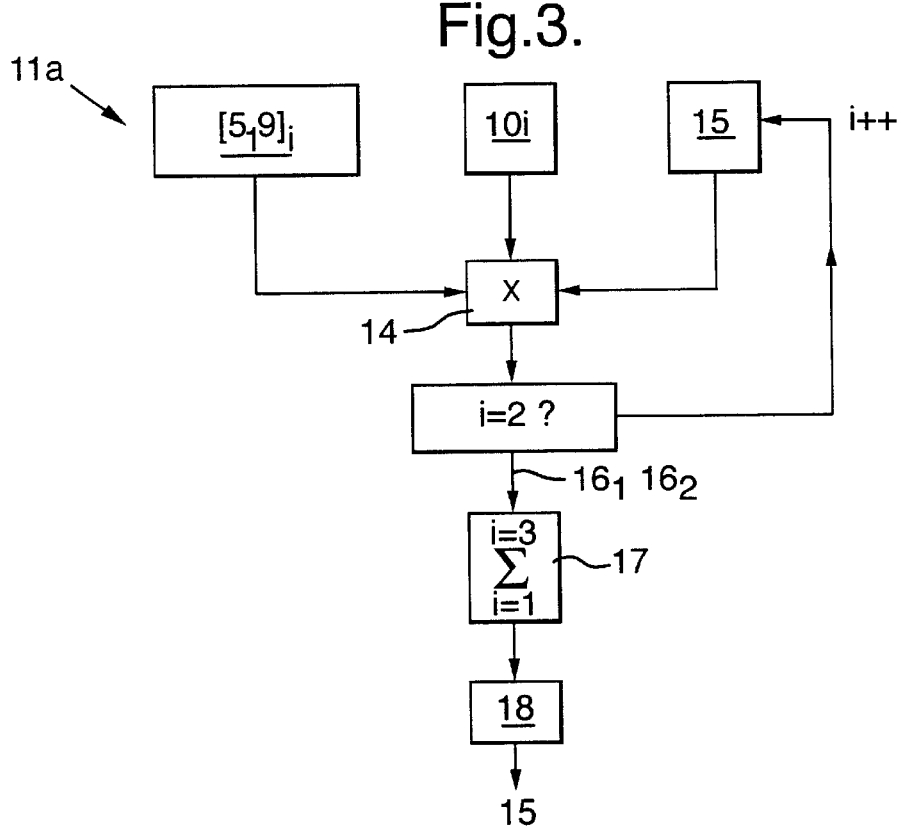
FIG. 3 is a block diagram of combining means forming part of the method steps applicable to the apparatus of FIG. 1.

The measurements of first and/or second positions 5, 9 of the plurality of first lights sources 6 relative to the sensing means 2a, 2b include imaging on at least two imaging devices light reflected or projected from the plurality of first lights sources 6, which imaging devices provide the sensing means 2a, 2b, and transmitting signals 12a, 12b indicative of the distribution of reflected or projected light from each of the at least two imaging devices to a processor 13. As shown in FIG. 3, these signals 12a, 12b are combined 11a by manipulating each of the first and second measured positions $(5, 9)_i$ with a matrix multiplication of the corresponding known movement transform $10_i$ and an unknown transform 15, which unknown transform 15 describes the first co-ordinate frame 1 in the second frame of reference 3 to give at least two expressions $16_i$. These expressions $16_i$ are then optimized at 18 by standard optimization techniques, such as the cost function, in order to determine the unknown transform 15.

Figure 4:
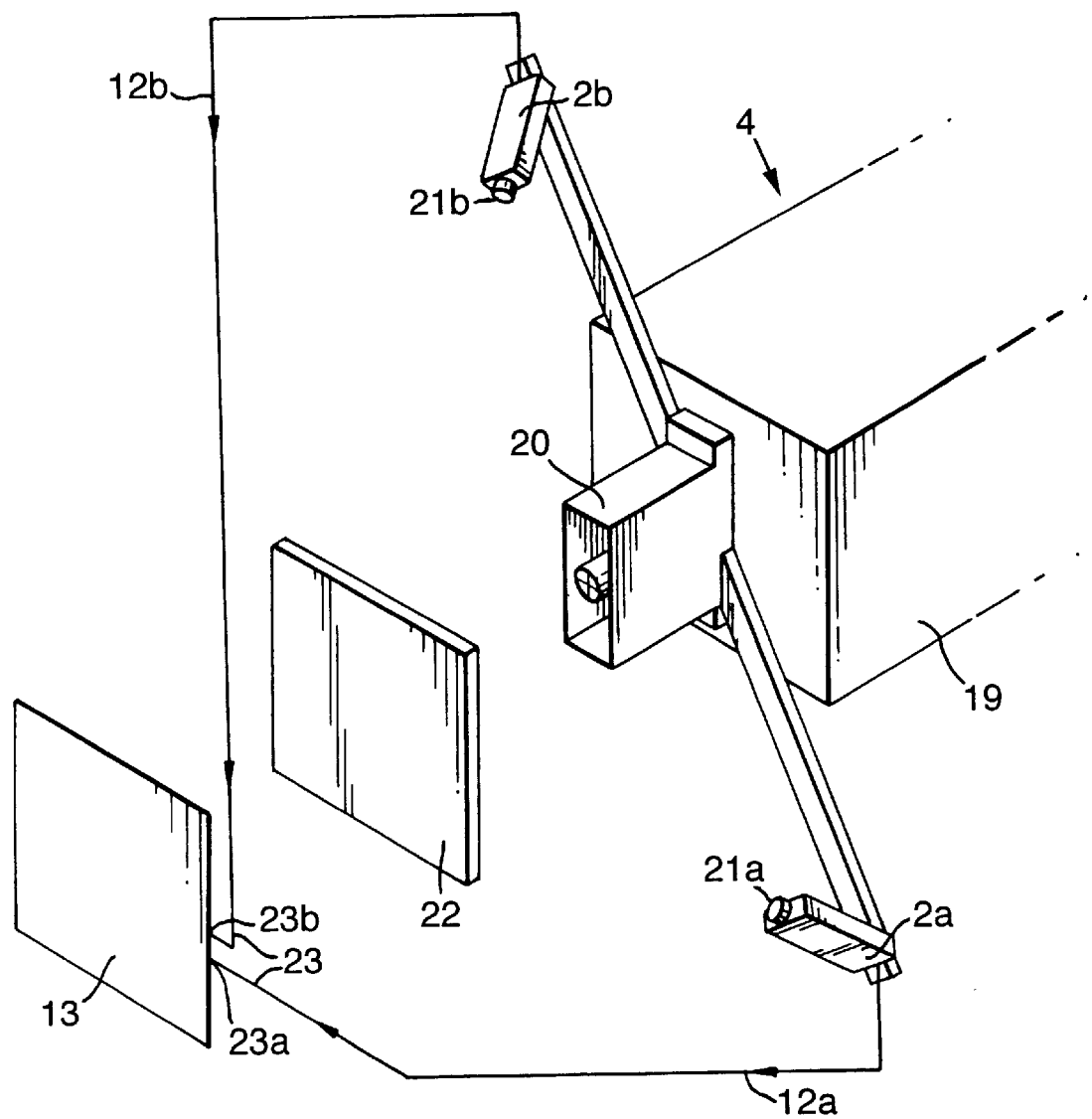
FIG. 4 is a schematic perspective representation of the apparatus of FIG. 1 showing indexing means and a first part.

The method of the invention, described above, is operable to calibrate a first co-ordinate frame 1 of an indexing means 4 in a second frame of reference 3 of a sensing means 2a, 2b by utilising apparatus of the invention, which apparatus includes sensing means 2a, 2b, indexing means 4 for moving the sensing means 2a, 2b when rigidly attached thereto, and a plurality of first light sources 6, which first lights sources include active light sources or illuminable reflecting points and are locatable at a fixed point in space. The indexing means 4 is preferably a robot 19 and an end effector 20, as shown in FIG. 4, which end effector 20 has the sensing means 2a, 2b attached thereto and substantially equi-spaced therearound. The sensing means 2a, 2b are preferably imaging devices, specifically metrology sensors operable to create digitisable images, such that the light projected or reflected from each of the first light sources 6 is reproduced as an image of white pixels against a dark background, which white pixels define a two dimensional spatial location of the first light sources 6 on each of the imaging devices 2a, 2b. These images are communicated as output signals 12a, 12b by means of communication links 23, which are preferably coaxial cables, to a processor 13 through framegrabber ports 23a, 23b. The imaging devices 2a, 2b are substantially equi-spaced around the end-effector 20.

The processor 13 is in operative association with the indexing means 4 and, having received signals 12a, 12b indicative of a first and a second position 5, 9 of each of the plurality of light sources 6 relative to the sensing means 2a, 2b, combines 11a the signals 12a, 12b together with an unknown transform 15 and a transform 10. The latter 10 defines movement from a first absolute position 7 of the indexing means 4 to a desired second absolute position 8 thereof, which movement is communicated from the processor 13 to the indexing means 4, and combination of these parameters 11a according to the above-described method determines the unknown transform 15.

The apparatus includes at least two second light sources 21a, 21b, each associated with a respective imaging device 2a, 2b. The plurality of first light sources 6 is preferably a plurality of reflective targets, each positionable on a first part 22, and each fabricated from retro-reflective material such that light projected by each of the second light sources 21a, 21b is reflected back therefrom in the exact direction of the incident ray. The first part 22 is shown in. FIGS. 5, 6 and 7, and includes a rectangular plate 22a, a shaft 22b of substantially circular cross-section, which shaft 22b is removably attachable to a first face 22c of the rectangular plate 22a and has at least one of the plurality of first light sources positioned thereon, and means 22d for removably attaching the shaft 22b to the rectangular plate 22a. FIG. 5 shows a plurality of clearance bores 22e opening through the rectangular plate 22a, which bores 22e are used to locate first light sources 6. Clearance bore 22h, which may be located at any position on the plate 22a, is provided for attaching the shaft 22bthereto.

The shaft 22b has an internally threaded blind bore 22f opening through one end of the shaft 22b for engagement with the means 22d, which is preferably a threaded hexagonally headed bolt. The bolt is insertable into the clearance bore 22h via a second face 22g of the rectangular plate to engage in the bore 22f in said shaft 22b and thence secure the shaft 22b to the rectangular plate 22a. In operation, one of the plurality of first light sources 6 is inserted into a blind bore 23, opening through the other end of the shaft 22b, and the remaining are inserted into the bores 22e to provide a three dimensional field of light.

The method of the present invention described can be implemented according to the following procedure, and with reference to FIGS. 2 and 3:

Move the indexing means 4 from a first absolute position 7 to at least two desired second absolute positions 8. Each of the movements is given by a specified transform $10_i$;

Measure first and second positions $(5, 9)_i$ of each of the first light sources 6: any two measurements on the same first light source from the first absolute position 7 to the second absolute position 8 are related by:

$$P_j^i = T_T^C T_{T1}^{Ti} T_C^T P_j^1 \quad (1)$$

where $T_T^C = T_T^{C-1}$ is the unknown transform 15, $P_j^i$ is the position 9 of target j at position i (thus the desired second absolute position for the $i^{th}$ movement), $P_j^i$ is the position 5 of target j at the first absolute position, and $T_{T1}^{Ti}$ is the desired transform $10_i$ of the indexing means 4;

Sum and optimise equation 1 for all first light sources 6 for each of the two movements from a first absolute position 7 to the desired second absolute positions 8:

$$\text{MIN} \left[ \sum_{i=1}^{n} \sum_{j=1}^{m} (T_T^C T_{Ti}^{Ti} T_C^T P_j^1 - P_j^i)^2 \right] \quad (2)$$

Where n≧2, m≧3 where m is the number of first lights sources.

The specification for transform $10_i$, that of two translations, or one translation and one rotation, is required to ensure that the measurements provide a non-degenerate solution of unknown transform 15, $T_T^C$.

What is claimed is:

1. A method for calibrating a first co-ordinate frame of an indexing means in a second frame of reference of a sensing means when the sensing means is substantially rigidly attached to the indexing means, including the steps of:

measuring first positions of a plurality of first light sources relative to the sensing means, each of which first light sources is remote from the sensing means and is either an active light source or an illuminable reflecting point, with the first positions corresponding to a first absolute position of the indexing means;

moving the indexing means;

measuring second positions of the plurality of first light sources relative to the sensing means, which second positions correspond to the desired second absolute position of the indexing means;

repeating the measurement of and movement from the first to second positions providing at least two sets of measurements of first and second positions corresponding to at least two movements, each of which at least two movements is a known, unique transform; and combining the at least two sets of measurements of first and second positions of the plurality of first light sources relative to the sensing means by a transformation means so as to calibrate for calibrating the first co-ordinate frame in the second frame of reference.

2. A method according to claim 1, in which the measurements of first and second positions of the plurality of first light sources relative to the sensing means includes the steps of:

imaging on at least two imaging devices light reflected or projected from the plurality of first light sources;

transmitting signals indicative of the distribution of reflected or projected light from each of the at least two imaging devices to a processors; and combining the signals and defining the first and second positions of the plurality of first light sources relative to the sensing means.

3. A method according to claim 2, in which the known movements corresponding to the at least two sets of first and second positions are two translations.

4. A method according to claim 2, in which the known movements corresponding to the at least two sets of first and second positions are one translation and one rotation.

5. A method according to claim 2, in which the known movements corresponding to the at least two sets of first and second positions are two rotations about different axes.

6. A method according to claim 5, including at least one of a translation and a further rotation.

7. A method according to claim 3, in which the combination of the at least two sets of first and second position measurements includes for each of the at least two sets of first and second position measurements, combining each of the first and second measured positions with a matrix multiplication of the corresponding known movement transform and an unknown transform, which unknown transform describes the first co-ordinate frame in the second frame of reference to give a set of at least two expressions, summing each of the set of at least two expressions, and optimizing any errors resulting therefrom by standard optimization techniques, in order to determine the unknown transform, which unknown transform calibrates the first co-ordinate frame in the second frame of reference.

8. An apparatus for calibrating a first co-ordinate frame of an indexing means in a second frame of reference of a sensing means when the sensing means is substantially rigidly attached to the indexing means, including sensing means, indexing means for moving the sensing means when the sensing means is substantially rigidly attached thereto, a plurality of first light sources, which first light sources include active light sources or illuminable reflecting points and are locatable at a fixed position in space, a processor in operative association with the indexing means, transformation means in operative association with the processor, transmitting means for transmitting signals indicative of a first and a second position of each of the plurality of first light sources relative to the sensing means from the sensing means to the processor, which first and second positions of each of the plurality of first light sources relative to the sensing means correspond to an absolute first position and a desired, absolute second position of the indexing means respectively, such that when the indexing means moves from the absolute first position to the desired absolute second position, the first and second positions of each of the plurality of first light sources relative to the sensing means transmitted to the processor are combined by the transformation means for calibrating the first co-ordinate frame in the second frame of reference.

9. Apparatus according to claim 8, wherein the indexing means is a robot and an end effector.

10. Apparatus according to claim 8, wherein the sensing means includes at least two imaging devices, each attachable to the end effector and each configurable to image each of the plurality of first light sources.

11. Apparatus according to claim 10, wherein each of the at least two imaging devices is a metrology sensor operable to create digitizable images, and which at least two imaging devices are substantially equi-spaced around the end effector.

12. Apparatus according to claim 11, including at least two second light sources, each associated with a respective imaging device, and wherein the plurality of first light sources is a plurality of reflective targets.

13. Apparatus according to claim 12 including a first part, which first part carries the plurality of light sources and includes a rectangular plate, a shaft of substantially circular cross-section, which shaft is removably attachable to a first face of the rectangular plate and has at least one of the plurality of first light sources positioned thereon, and means for removably attaching the shaft to the rectangular plate.

14. Apparatus according to claim 13, wherein the transmitting means includes coaxial cables and frame grabber ports for transmitting a signal indicative of the first and a second positions of each of the plurality of first light sources relative to the sensing means to the processor.

15. A method for calibrating a first co-ordinate frame of a robot and an end effector in a second frame of reference of a sensor when the sensor is substantially rigidly attached to the robot and end effector, including the steps of:

measuring first positions of a plurality of first light sources relative to the sensor, each of which first light sources is remote from the sensor and is either an active light source or an illuminable reflecting point, with the first positions corresponding to a first absolute position of the robot and end effector;

moving the robot and end effector;

measuring second positions of the plurality of first light sources relative to the sensor, which second positions correspond to the desired second absolute position of the robot and end effector;

repeating the measurement of and movement from the first to second positions providing at least two sets of measurements of first and second positions corresponding to at least two movements, each of which at least two movements is a known, unique transform; and combining the at least two sets of measurements of first and second positions of the plurality of first light sources relative to the sensor by a transformer calibrating the first co-ordinate frame in the second frame of reference.

16. A method according to claim 15, in which the measurements of first and second positions of the plurality of first light sources relative to the sensor includes the steps of:

imaging on at least two imaging devices light reflected or projected from the plurality of first light sources;

transmitting signals indicative of the distribution of reflected or projected light from each of the at least two imaging devices to a processor; and combining the signals and defining the first and second positions of the plurality of first light sources relative to the sensor.

17. A method according to claim 16, in which the known movements corresponding to the at least two sets of first and second positions are two translations.

18. A method according to claim 16, in which the known movements corresponding to the at least two sets of first and second positions are one translation and one rotation.

19. A method according to claim 16, in which the known movements corresponding to the at least two sets of first and second positions are two rotations about different axes.

20. A method according to claim 19, including at least one of a translation and a further rotation.

21. A method according to claim 17, in which the combination of the at least two sets of first and second position measurements includes for each of the at least two sets of first and second position measurements, combining each of the first and second measured positions with a matrix multiplication of the corresponding known movement transform and an unknown transform, which unknown transform describes the first co-ordinate frame in the second frame of reference to give a set of at least two expressions, summing each of the set of at least two expressions, and optimizing any errors resulting therefrom by standard optimization techniques, in order to, determine the unknown transform, which unknown transform calibrates the first co-ordinate frame in the second frame of reference.

22. An apparatus for calibrating a first co-ordinate frame of a robot and end effector in a second frame of reference of a sensor when the sensor is substantially rigidly attached to the robot and end effector, including a sensor, a robot and end effector for moving the sensor when the sensor is substantially rigidly attached thereto, a plurality of first light sources, which first light sources include active light sources or illumninable reflecting points and are locatable at a fixed position in space, a processor in operative association with the robot and end effector, transformer in operative association with the processor, transmitter for transmitting signals indicative of a first and a second position of each of the plurality of first light sources relative to the sensor from the sensor to the processor, which first and second positions of each of the plurality of first light sources relative to the sensor correspond to an absolute first position and a desired, absolute second position of the robot and end effector, respectively, such that when the robot and end effector moves from the absolute first position to the desired absolute second position, the first and second positions of each of the plurality of first light sources relative to the sensor transmitted to the processor are combined by the transformer calibrating the first co-ordinate frame in the second frame of reference.

23. Apparatus according to claim 22, wherein the sensor includes at least two imaging devices, each attachable to the end effector and each configurable to image each of the plurality of first light sources.

24. Apparatus according to claim 23, wherein each of the at least two imaging devices is a metrology sensor operable to create digitizable images, and which at least two imaging devices are substantially equi-spaced around the end effector.

25. Apparatus according to claim 24, including at least two second light sources, each associated with a respective imaging device, and wherein the plurality of first light sources is a plurality of reflective targets.

26. Apparatus according to claim 25 including a first part, which first part carries the plurality of light sources and includes a rectangular plate, a shaft of substantially circular cross-section, which shaft is removably attachable to a first face of the rectangular plate and has at least one of the plurality of first light sources positioned thereon, and means for removably attaching the shaft to the rectangular plate.

27. Apparatus according to claim 26, wherein the transmitter includes coaxial cables and frame grabber ports for transmitting a signal indicative of the first and a second positions of each of the plurality of first light sources relative to the sensing means to the processor.

* * * * *